United States Patent [19]

Balleys

[11] Patent Number: 4,769,520
[45] Date of Patent: Sep. 6, 1988

[54] APPARATUS AND METHOD FOR ELECTRICAL DISCHARGE MACHINING OF A WORKPIECE WITH AN INCLINED ELECTRODE WIRE

[75] Inventor: Francois Balleys, Petit-Lancy, Switzerland

[73] Assignee: Charmilles Technologies S.A., Geneva, Switzerland

[21] Appl. No.: 942,055

[22] Filed: Dec. 18, 1986

Related U.S. Application Data

[63] Continuation of Ser. No. 731,558, May 7, 1985, abandoned.

[30] Foreign Application Priority Data

Jun. 26, 1984 [CH] Switzerland .................. 3080/84

[51] Int. Cl.[4] .............................................. B23H 7/04
[52] U.S. Cl. ............................ 219/69 W; 219/69 M; 219/69 P
[58] Field of Search ............... 219/69 P, 69 W, 69 M, 219/69 C

[56] References Cited

U.S. PATENT DOCUMENTS

| | | | |
|---|---|---|---|
| 2,979,639 | 4/1961 | Williams et al. | 219/69 P |
| 3,604,885 | 9/1971 | Inoue | 219/69 P |
| 3,609,281 | 9/1971 | Kauffman | 219/69 S |
| 3,988,560 | 10/1976 | Losey et al. | 219/69 P |
| 4,021,635 | 5/1977 | Losey et al. | 219/69 P |
| 4,236,057 | 11/1980 | Inoue | 219/69 P |
| 4,329,558 | 5/1982 | Martin | 219/69 M |
| 4,363,948 | 12/1982 | Itoh | 219/69 P |
| 4,383,160 | 5/1983 | Obara | 219/69 P |
| 4,559,432 | 12/1985 | Itoh | 219/69 W |
| 4,575,605 | 3/1986 | Martin | 219/69 W |

FOREIGN PATENT DOCUMENTS

| | | | |
|---|---|---|---|
| 52-58195 | 5/1977 | Japan | 219/69 W |
| 120930 | 9/1980 | Japan | 219/69 W |
| 57-41129 | 3/1982 | Japan | 219/69 W |
| 58-28430 | 2/1983 | Japan | 219/69 M |
| 59-30620 | 2/1984 | Japan | 219/69 S |
| 59-42218 | 3/1984 | Japan | 219/69 W |
| 639886 | 12/1983 | Switzerland | 219/69 W |

*Primary Examiner*—A. D. Pellinen
*Assistant Examiner*—Geoffrey S. Evans
*Attorney, Agent, or Firm*—Gifford, Groh, VanOphem, Sheridan, Sprinkle and Dolgorukov

[57] ABSTRACT

An apparatus and method for preventing machining errors due to changes in the inclination of the electrode wire in a travelling wire EDM apparatus wherein the electrode wire effectuates a cut on a workpiece such that the workpiece is provided with a bevel or taper on its peripheral surface. A test or trigger electrical pulse of low power is applied between the electrode wire and the workpiece in the machining zone and the location where the trigger electrical pulse occurs along the length of the electrode wire in the machining zone is detected and the trigger electrical pulse is converted into a machining electrical discharge, or not converted, according to the speed of feed of the electrode wire at such location while being displaced transversely along the cutting path in the course of a change of inclination of the electrode wire. In this manner, the feed of the wire into the workpiece is continuously and instantaneously adapted to the change in inclination of the electrode wire which permits to maintain the same machining gap all along the length of the electrode wire in the machining zone and to ensure that the electrode wire and the surface machined on the workpiece remain constantly parallel.

5 Claims, 1 Drawing Sheet

APPARATUS AND METHOD FOR ELECTRICAL DISCHARGE MACHINING OF A WORKPIECE WITH AN INCLINED ELECTRODE WIRE

This is a continuation of co-pending application Ser. No. 731,558 filed on May 7, 1985, now abandoned.

BACKGROUND OF THE INVENTION

The present invention relates in general to travelling wire EDM apparatus and methods, and more particularly to an apparatus and method for effecting a cut in a workpiece with an electrode wire inclined at an angle relative to the workpiece.

While effecting a cut in a workpiece by way of an electrode wire, it is often necessary to incline the electrode wire relative to the workpiece at an angle other than a right angle. If, in the course of the cut, the inclination of the electrode wire must be changed, or if the direction of feed travel of the electrode wire into the workpiece must be changed, different portions of the electrode wire are caused to travel in the direction of feed into the workpiece along machining paths of different lengths between the beginning and the end of the cutting operation.

It is evident that in the course of effecting a cut in a lateral face of a workpiece to obtain, for example, a truncated conical part, the length of the wire trajectory along the perimeter of the smaller base of the truncated cone is shorter than the length of the trajectory along the perimeter of the larger base. Similarly, while cutting a pyramidal workpiece and reaching the end of a cutting pass on an angled or tapered surface, the feed of the electrode wire into the workpiece must be interrupted when reaching the recessed corner of the workpiece until the cut effected by the electrode wire in the workpiece reaches the tip of the corresponding overhanging corner, or even until it has progressed beyond the overhanging corner, up to a position wherein the inclination of the plane of the cut is returned to a minimum value.

In order to simplify the following description of the apparatus and method and avoid continuously referring to instantaneous distances measured along the portion of the electrode wire momentarily held between the wire support and guide members, the positions occupied by the electrode wire will be described as if the electrode wire was not displaced longitudinally, although it is well known by those skilled in the art that the electrode wire must be continuously renewed at the machining zone in order to compensate for the electro-erosion of the wire during machining and that, consequently, the electrode wire is constantly travelling along its longitudinal axis between its support and guide members.

Because the width of the cut in the workpiece varies as an inverse function of the speed of advance, or lateral displacement of the electrode wire into the workpiece, such lateral displacement being hereinafter referred to as the "feed" of the electrode wire, if different portions of the electrode wire are fed into the workpiece at different speeds, there results an excessive material removal rate where the speed of feed of the wire is low and too small a material rate where the speed of feed of the wire is higher. An extreme case exists when a conical volume is cut from or in the workpiece. The machined surface areas proximate the tip of the conical volume are subjected to excessive material removal causing a rounding of the conical shape because the speed of feed of the electrode wire into the workpiece is practically nil at the tip of the conical volume during machining of the peripheral surface of the cone.

In order to compensate, to a certain degree, for such inaccuracies in dimensions and shape and avoid the effect caused by the localized lack of feed of a portion of the electrode wire when reaching the lateral edge of workpieces cut with a taper or bevel, German patent publication No. DE-2818058 provides for a progressive change of the angle of inclination of the electrode wire within to the plane of the cut, such that all the portions of the whole active length of the electrode wire reach a corner simultaneously, i.e. such that the wire is oriented substantially parallel to the line representing the tip of the corner when the wire reaches the corner, even though the wire may have had a different orientation at the beginning of the cut. In this manner, complete stoppage of the feed of the wire when reaching the recessed portion of the corner is avoided. However, such an arrangement permits only to spread over the length of the cutting path the machining errors otherwise concentrated in the vicinity of a corner. This is due to the fact that the speed of feed of the wire into the workpiece varies for different portions of the wire along the portion of the cutting path during which inclination of the electrode wire progressively varies, and, consequently, the material removal rate varies correspondingly, resulting in machining errors.

SUMMARY OF THE INVENTION

The present invention has for its principal object the elimination of machining errors resulting from local differences in the speed of feed of an electrode wire into a workpiece, in a travelling wire EDM apparatus, at different locations along the length of the wire situated in the machining zone, resulting from change of orientation of the wire relative to the workpiece.

The present invention will be best understood by those skilled in the art when the following description of an example of the best mode contemplated at the present for practicing the invention is read in conjunction with the drawing wherein:

DETAILED DESCRIPTION OF THE PREFERRED EMBODIMENTS

Figure 1:
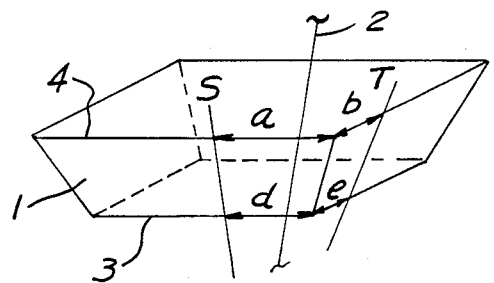
FIG. 1 illustrates schematically the differences in distances of feed travel between different portions of the effective length of a travelling wire electrode cutting a workpiece in the form of a truncated pyramid.

Referring to FIG. 1, a workpiece 1 in the shape of a truncated pyramid is cut by way of an electrode wire 2. It is immediately apparent that the portion of the electrode wire 2 which cuts the workpiece 1 proximate the lower perimeter 3 of the truncated pyramid travels a distance shorter than the portion of the electrode wire situated proximate the upper perimeter 4 of the truncated pyramid, in the course of effecting a cut on a lateral face of the workpiece 1. Between the position S of the wire 2 while effecting a cut along one lateral face of the truncated pyramid to the position T of the wire while effecting a cut along the next consecutive lateral face of the truncated pyramid, the wire is translated relative to the workpiece of a distance (a+b) along the upper perimeter 4 of the truncated pyramid and along a shorter distance (d+e) along the lower perimeter 3 of the truncated pyramid. If the orientation, or inclination, of the electrode wire 2 is not progressively changed in the course of a full cutting operation as shown in phantom line at 2, but remains the same over a portion of the machining path, the difference in feed speed between the high portion and the low portion of the wire will be more important during the remaining of the cut.

Figure 2:
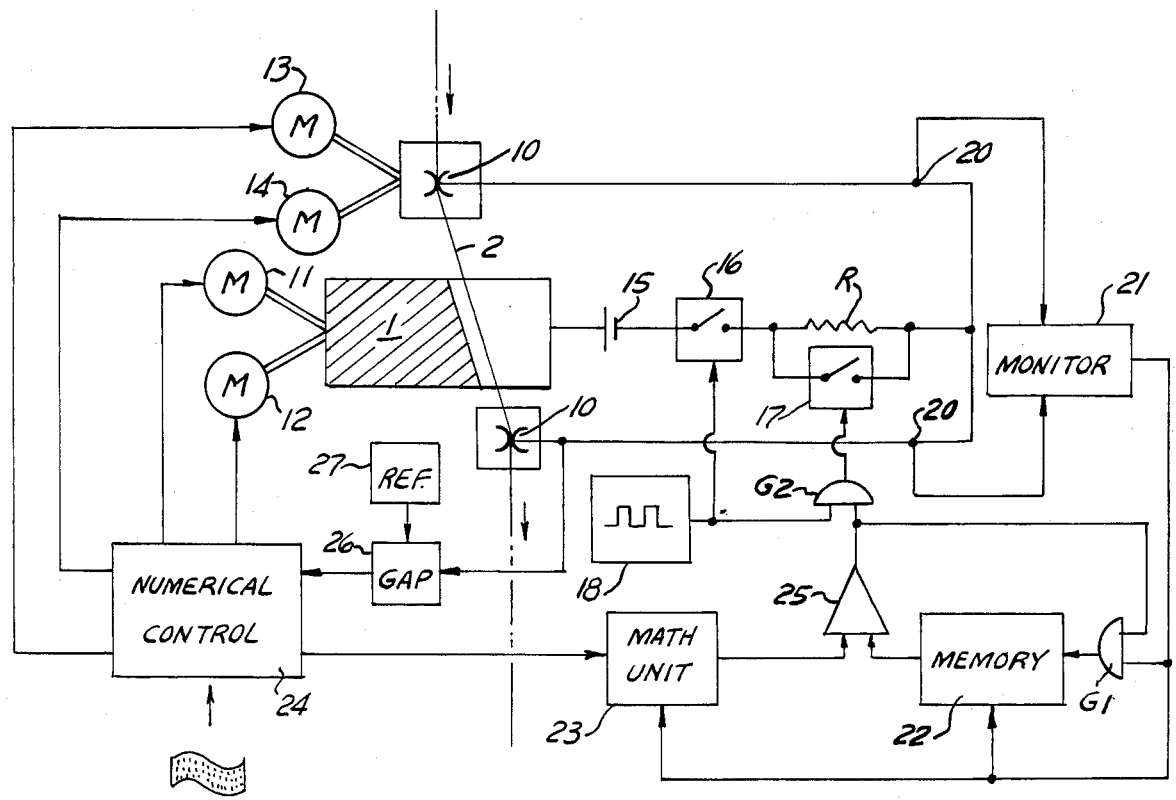
FIG. 2 illustrates schematically an EDM apparatus for practicing the method of the invention.

In the schematic of FIG. 2, which illustrates the control circuit for an EDM apparatus according to the invention, reference numerals 1 and 2 designate, as in FIG. 1, respectively, the workpiece and the electrode wire for machining the workpiece. The electrode wire 2 is stretched between two electrical contact-wire guide members 10 relatively to which it travels longitudinally to continuously renew the active portion of the wire in the machining zone between the electrode wire and the workpiece. A pair of servo motors 11 and 12 control the displacement of the workpiece 1 along two orthogonal axes in a single plane, and two servo motors 13 and 14 control the displacement of one of the wire contact-guide members 10 along crossed axes, and consequently the inclination of the electrode wire 2 relative to the workpiece 1.

A pulse generator is connected across the workpiece 1 and the electrode wire 2. The pulse generator comprises a DC power supply 15 in series with a switch 16 and a limiting resistor R. The resistor R is shunted by a switch 17. The switch 16 is controllably operated by a frequency generator 18 such that electrical discharges of relatively low energy are applied across the workpiece 1 and the electrode wire 2, through the limiting resistor R, when the switch 17 is open and electrical discharges of higher energy are applied across the workpiece 1 and the electrode wire 2 when the switch 17 is closed.

The location of each electrical discharge along the length of the electrode wire 2 between the wire contact-guide members 10 is determined by a monitoring circuit 21 connected across the contact-guide members 10 via connections 20, as disclosed in detail in U.S. Pat. No. 4,329,558. In order to determine the location of each machining electrical discharge independently of the current level, the monitoring circuit 21 determines the ratio of the current circulating through one portion of the electrode wire 2 between one contact-guide member 10 and the electrical discharge and the current circulating through the other portion of the wire 2 to the machining electrical discharge from the other contact-guide member 10, or the differences between the two currents, or yet the quotient of the difference between the two currents by the sum of the currents.

A memory 22 stores the information thus obtained from the monitoring circuit 21 through an AND gate G1, the information stored in the memory 22 representing the location along the length of the electrode wire 2 between the contact-guide members 10 where the machining electrical discharge took place. For example, if it is assumed that the length of the electrode wire 2 between the contact-guide members 10 is divided in a predetermined number of sectors, the monitoring circuit 21 supplies to the memory 22 information in a digital form that indicates the location of the sector from which the most recent machining electrical discharge flowed between the electrode wire 2 and the workpiece 1. In addition, the monitoring circuit 21, supplies to the memory 22 a count of the pilot pulses or trigger pulses of low energy having been converted into corresponding power pulses or machining electrical discharges. The total number of machining electrical discharges occuring within a predetermined period of time, or time unit, in each of the sectors of the electrode wire 2 is stored in the memory 22 and continuously updated in the memory, the memory 22 being for example provided for that purpose with separate transfer registers each corresponding to one of the wire sectors. Each register is thus able to store the number of machining electrical discharges occuring during each time unit in the electrode wire sector corresponding to that register.

A calculating circuit 23 develops and updates constantly the number of machining electrical discharges which are required in each sector for obtaining a predetermined progressive spread of the electrode wire feed speed in consecutive sectors of the electrode wire. The feed speed spread depends principally on the relative speed between each contact-guide member 10 and the workpiece 1; on the distance separating the two contact-guide members 10 and on the location or order of each sector along the length of the electrode wire between the two contact-guide members 10. In order to interpret all these parameters, the calculating circuit 23 accepts at one of its inputs information data signals from the monitoring circuit 21 and at another of its inputs command signals from a numerical control unit 24 controlling the operation of the servo motors 11, 12, 13 and 14, according to an appropriate program defining the machining path. The numerical control unit 24 receives in addition signals from a gap regulator 26 whose function it is to adjust the speed of feed of the electrode wire as a function of the differences between the effective machining voltage and a reference voltage $U_R$ supplied by a reference voltage source 27.

A comparator 25 compares the number of machining electrical discharges having already occured from time $t_o$ in the sector in which occurred a trigger pulse with a reference value representing the ideal number of machining electrical discharges that should occur in the same sector, the reference value being supplied by the calculation circuit 23. When the number of machining electrical discharges having already occurred is less than a limit which can be equal to the reference value, or different from the reference value by a predetermined constant in order to take into consideration random fluctuations, the comparator 25 closes through an AND gate $G_2$ the switch 17 in order to produce a power, or machining, electrical discharge at the location of the trigger discharge. The AND gate $G_2$ has another input to which are applied pulses from the frequency generator 18 operating the switch 16 such as to provide appropriate timing between the momentary closing of the switch 17 and the closing of the switch 16. Simultaneously with closing the switch 17, the comparator 25 supplies to the memory 22 through the AND gate $G_1$ an addition of one new machining electrical discharge to the number of machining electrical discharges having already occurred in the same sector of the electrode wire. If, on the contrary, the number of machining electrical discharges stored in the memory 22 exceeds the predetermined value limit for that sector, the comparator 25 leaves the switch 17 open and thus triggers a new trigger discharge, without recording the preceeding discharge in the memory 22. The register in the memory 22 can be arranged such as to accumulate the total number of machining electrical discharges in each sector during the overall machining operation or, in the alternative, the registers may be periodically reset or arranged to constantly indicate the number of machining electrical discharges having occurred in each sector during the last time unit, that is, the momentary number of machining electrical discharges by unit of time. In arrangements wherein the registers corresponding each to a different sector of the electrode wire are periodically reset, the registers may be reset to zero or they may be reset such as to leave in each register a number representing the excess of machining electrical discharges, over the predetermined reference, which took place in the appropriate sector corresponding to the register, in order to avoid an accumulation of errors. Similarly, the reference determined by the calculation circuit 23 could correspond to cumulative values from the beginning of the machining operation but, preferably, it corresponds to the instantaneous value or the preset frequency of the power electrical discharges in each sector, determined according to the instantaneous relative motions between that sector and the workpiece.

According to a preferred embodiment, the calculation circuit 23 does not determine a number of absolute values each of which represents for example the number of machining electrical discharges to be obtained by unit of time in a predetermined sector, but only the ratio to be maintained between the number of machining electrical discharges occuring in the diverse sectors, at the location where machining is effected momentarily, either during each unit of time or cumulatively since the beginning of the machining operation. The limit values are then determined in an order of magnitude which can for example be calculated from the total number of machining electrical discharges having taken place in all the sectors, or during the last unit of time, or from the beginning of the machining operation.

Maintaining in each sector of the electrode wire a number of machining electrical discharges as a function either of the speed of feed of the wire 1 in such sector, or of the travel that the wire is to accomplish, permits to obtain a constant gap over the whole useful length of the wire and to avoid any machining errors due to a variable gap.

Having thus described the present invention by way of an example of structure for practicing the method of the invention, modifications whereof will be apparent to those skilled in the art.

What is claimed as new is as follows:

1. A method for cutting by machining electrical discharges an electrically conductive workpiece by means of an electrode wire stretched between a pair of guide members, said electrode wire constantly moving longitudinally in one direction between the guide members such as to have a portion of said electrode wire constantly renewed in a machining zone formed between said workpiece and said electrode wire, said wire being fed into said workpiece along a cutting path with a progressively changing angle of inclination of said portion of said electrode wire within the plane of the machining path, said portion of the electrode wire being divided into a plurality of sectors whereby the speeds of feed of each sector of said portion varies according to the location of said sector of said portion of said electrode wire, said method comprising determining for each sector a magnitude which is a function of the number of machining discharges having occurred in each said sector for a preset unit of time or since the beginning of the machining, producing a trigger pulse at a low energy, detecting in which of said sectors said trigger pulse takes place, comparing the magnitude for the sector in which said trigger pulse has occurred to a preset reference value dependent at least upon the location of said sector, and modulating the power of the electrical discharge as a function of the result of said comparing step.

2. The method of claim 1 and further comprising the steps of repeatedly effecting a machining cycle each consisting of interrupting the trigger pulse in the event that the count exceeds the preset reference value or a limit which differs from the preset reference value by a predetermined constant and transforming the discharge into a machining electrical discharge having an energy level higher than that of the trigger pulse in the event that the count is lower than said preset reference value or a limit which differs from the preset reference value by a predetermined constant is lower than said predetermined level.

3. A method according to claim 1 in which said preset reference value is a function of the speed of the feed in said sector.

4. An apparatus for cutting by machining electrical discharges an electrically conductive workpiece by means of an electrode wire stretched between a pair of support and guide members, said electrode wire being displaced longitudinally such as to have a portion of said electrode wire constantly renewed in a machining zone between said workpiece and said electrode wire, herein said electrode wire is fed substantially transversely into said workpiece for effecting a cut in said workpiece according to a predetermined path with a progressively changing angle of inclination of said portion of said electrode wire within the plane of said predetermined path and wherein said portion of said electrode wire is divided into a plurality of sectors which are fed at diverse speeds of feed into said workpiece, said apparatus comprising means for determining for each sector a magnitude which is a function of the number of machining discharges having occurred in said sector for a preset amount of time or since the beginning of the machining, producing a trigger pulse at a low energy, detecting in which of said sectors said trigger pulse takes place, means for comparing the magnitude for the sector in which said trigger pulse has occurred to a preset reference value dependent at least upon the location of each sector, means responsive to said comparing means for modulating the electrical discharge within said machining zone.

5. The apparatus of claim 4 wherein said means for modulating the machining electrical discharge comprises means for controlling the relative displacement of said workpiece and said electrode wire for feeding said electrode wire into said workpiece for effecting a cut, means for adjusting the speed of feed of said sectors of said portions of said electrode wire for maintaining a predetermined average gap between the workpiece and said electrode wire, means for detecting the one of said sectors at which a machining electrical discharge occurs, and further comprising a memory controlled by said detection means for separately storing the number of machining electrical discharges occurring within a predetermined time period at each of said sectors of said portion of said electrode wire, means for determining for each of said sectors the relative number of machining electrical discharges to be provided during said time period as a function of the difference between the speed of feed of said sector and the speed of feed of at least another sector, means for comparing the number of machining electrical discharges occurring during said time period in the sector in which said electrical pulse of low energy has been provided with the number of machining electrical discharges to be produced in said sector, and a logic circuit for converting the low energy electrical pulse into a machining electrical discharge in the event that the number of machining electrical discharges occurring during said time period is less than a predetermined threshold or a limit which differs from the predetermined threshold by a predetermined constant and for producing a new low energy electrical pulse in the event that the number of machining electrical discharges occurring during said said time period exceeds said predetermined threshold or a limit which differs from the predetermined threshold by a predetermined constant.

* * * * *